No. 794,119. PATENTED JULY 4, 1905.
A. RICHARDSON.
HOE.
APPLICATION FILED OCT. 12, 1904.

Witnesses
Inventor
A. Richardson
Attorneys

No. 794,119.                                              Patented July 4, 1905.

UNITED STATES PATENT OFFICE.

AMOS RICHARDSON, OF MILTON, OREGON.

HOE.

SPECIFICATION forming part of Letters Patent No. 794,119, dated July 4, 1905.

Application filed October 12, 1904. Serial No. 228,164.

*To all whom it may concern:*

Be it known that I, AMOS RICHARDSON, a citizen of the United States, residing at Milton, in the county of Umatilla, State of Oregon, have invented certain new and useful Improvements in Hoes; and I do hereby declare the following to be a full, clear, and exact description of the invention, such as will enable others skilled in the art to which it appertains to make and use the same.

This invention relates to hoes; and it has for its object to provide a construction which will be particularly efficient in the operation of weeding, a further object of the invention being to provide as an article of manufacture a specific structure which will be cheap and simple of manufacture and in which the cutting-blade may be removed for sharpening and may be replaced without expenditure of any considerable time or labor.

Figure 1:
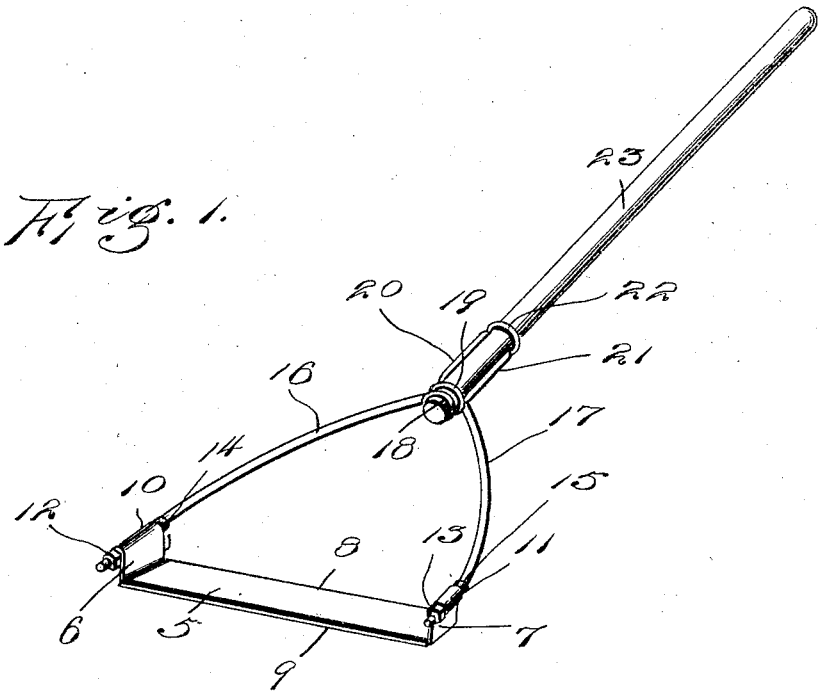
Figure 2:
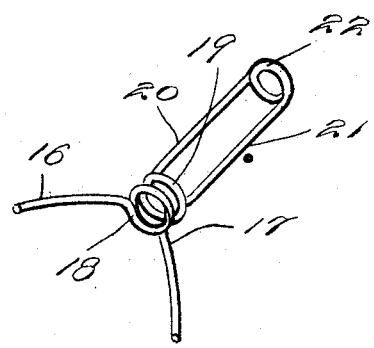

In the drawings forming a portion of this specification, and in which like numerals of reference indicate similar parts in both the views, Figure 1 is a perspective view of the hoe. Fig. 2 is a detail view showing the shank formed to receive the handle.

Referring now to the drawings, the present hoe comprises a blade consisting of a narrow metal plate 5, the end portions of which are turned upwardly at right angles, as shown at 6 and 7, while the longitudinal edges 8 and 9 are sharpened for interchangeable use under different conditions.

At the upper ends of the portions 6 and 7 are formed loops 10 and 11, the axes of these loops being oblique to the portions 6 and 7, respectively, so that they are at acute angles to the body portion of the blade 5. The shank of the hoe consists of a metal bar, the ends of which are engaged in the loops 10 and 11, in which positions they are held by nuts 12 and 13 on the ends of the bar, the looped portions being clamped between the nuts and suitable shoulders 14 and 15. This arrangement not only serves to hold the shank securely to the blade, but permits of removal of the blade for sharpening or for reversal to satisfy different conditions of use. From the loops 10 and 11 the sides 16 and 17 of the bar that forms the shank converge. Loops 18 and 19 are then formed in the sides 16 and 17 to register, and beyond these loops the bar is continued, as shown at 20 and 21, and is then bent to form a loop 22. A handle 23 is engaged in the loops 22, 19, and 18.

With the blade arranged as shown in Fig. 1 of the drawings the hoe may be held with the edge 8 lower than the edge 9, so that the blade may be drawn beneath the surface of the ground and under the roots of the weeds, and by reason of the greater elevation of the edge 9 the weeds will be thrown from the ground.

When it is desired to sharpen the blade of the hoe, it may be readily removed from the shank by first removing the nuts, as will be understood. Furthermore, it will be noted that the formation of the blade is such that it will cost but very little, while the shank may be made at a low cost, the entire hoe being extremely cheap, simple, and durable.

What is claimed is—

1. As an article of manufacture, a hoe consisting of a blade having its end portions turned upwardly and having loops formed at the extremities of said upturned portions, a shank consisting of a bar bent at its intermediate portion to form registering loops and having its extremities threaded and engaged through the loops of the blade, clamping-nuts engaged with the ends of the bar, shoulders between which and the nuts the looped portions of the blade are clamped, and a handle engaged in the loops of the bar.

2. As an article of manufacture, a hoe consisting of a blade having its end portions turned upwardly and having loops formed at the extremities of said upturned portions, a shank consisting of a bar having its extremities threaded and engaged through the loops of the blade, clamping-nuts engaged with the ends of the bar, shoulders between which and the nuts the loop portions of the blade are clamped, and a handle connected with the shank.

In testimony whereof I affix my signature in presence of two witnesses.

AMOS RICHARDSON.

Witnesses:
 J. M. FREESTONE,
 FRED J. IRWIN.